United States Patent
Bhavaraju et al.

(10) Patent No.: US 9,057,137 B2
(45) Date of Patent: *Jun. 16, 2015

(54) METHOD AND DEVICE FOR CARBOXYLIC ACID PRODUCTION

(75) Inventors: Sai Bhavaraju, West Jordan, UT (US); Kean Duffey, Salt Lake City, UT (US)

(73) Assignee: CERAMATEC, INC., Salt Lake City, UT (US)

( * ) Notice: Subject to any disclaimer, the term of this patent is extended or adjusted under 35 U.S.C. 154(b) by 991 days.

This patent is subject to a terminal disclaimer.

(21) Appl. No.: 13/103,716

(22) Filed: May 9, 2011

(65) Prior Publication Data

US 2012/0031769 A1    Feb. 9, 2012

Related U.S. Application Data

(60) Provisional application No. 61/371,113, filed on Aug. 5, 2010.

(51) Int. Cl.
*C25B 3/00* (2006.01)
*C25B 1/02* (2006.01)
*B01D 61/42* (2006.01)

(52) U.S. Cl.
CPC .............. *C25B 1/02* (2013.01); *B01D 61/422* (2013.01); *C25B 3/00* (2013.01)

(58) Field of Classification Search
CPC .................................... C25B 1/22; C25B 3/00
USPC ........................................................ 205/440
See application file for complete search history.

(56) References Cited

U.S. PATENT DOCUMENTS

| | | | |
|---|---|---|---|
| 2,760,926 | A | 8/1956 | Kronenthal |
| 2,867,569 | A | 1/1959 | Kronenthal |
| 3,193,479 | A | 7/1965 | Baizer |
| 3,249,521 | A | 5/1966 | Baizer |

(Continued)

FOREIGN PATENT DOCUMENTS

| | | |
|---|---|---|
| CN | 101089231 A | 12/2007 |
| CN | 101336313 A | 12/2008 |

(Continued)

OTHER PUBLICATIONS

Stapley, et al., "English Language Abstract", CN101336313A, (Dec. 31, 2008),1.

(Continued)

*Primary Examiner* — Edna Wong
(74) *Attorney, Agent, or Firm* — David Fonda

(57) ABSTRACT

A method for producing and recovering a carboxylic acid in an electrolysis cell. The electrolysis cell is a multi-compartment electrolysis cell. The multi-compartment electrolysis cell includes an anodic compartment, a cathodic compartment, and a solid alkali ion transporting membrane (such as a NaSICON membrane). An anolyte is added to the anodic compartment. The anolyte comprises an alkali salt of a carboxylic acid, a first solvent, and a second solvent. The alkali salt of the carboxylic acid is partitioned into the first solvent. The anolyte is then electrolyzed to produce a carboxylic acid, wherein the produced carboxylic acid is partitioned into the second solvent. The second solvent may then be separated from the first solvent and the produced carboxylic acid may be recovered from the second solvent. The first solvent may be water and the second solvent may be an organic solvent.

19 Claims, 6 Drawing Sheets

(56) References Cited

U.S. PATENT DOCUMENTS

| | | | |
|---|---|---|---|
| 3,885,626 A | 5/1975 | Gale et al. | |
| 3,992,471 A | 11/1976 | Priegnitz | |
| 3,994,471 A | 11/1976 | Turolla | |
| 4,006,065 A | 2/1977 | Meresz et al. | |
| 4,123,336 A | 10/1978 | Seko et al. | |
| 4,402,804 A | 9/1983 | Jackson | |
| 4,464,236 A | 8/1984 | Noding | |
| 5,084,146 A | 1/1992 | Huang | |
| 5,290,404 A * | 3/1994 | Toomey | 205/450 |
| 5,290,405 A * | 3/1994 | Joshi et al. | 205/338 |
| 5,580,430 A | 12/1996 | Balagopal et al. | |
| 5,633,400 A | 5/1997 | Wagner et al. | |
| 5,841,002 A | 11/1998 | Harrison et al. | |
| 5,892,107 A | 4/1999 | Farone et al. | |
| 6,193,872 B1 | 2/2001 | Reason et al. | |
| 6,238,543 B1 | 5/2001 | Law et al. | |
| 6,362,380 B1 | 3/2002 | Eicken et al. | |
| 6,392,091 B2 | 5/2002 | Lin | |
| 8,506,789 B2 | 8/2013 | Bhavaraju et al. | |
| 2001/0019020 A1 | 9/2001 | Merk et al. | |
| 2005/0177008 A1 | 8/2005 | Balagopal et al. | |
| 2008/0177114 A1 | 7/2008 | Goossen et al. | |
| 2008/0245671 A1 | 10/2008 | Balagopal et al. | |
| 2009/0074611 A1 | 3/2009 | Monzyk et al. | |
| 2009/0305942 A1 | 12/2009 | Day et al. | |
| 2010/0159553 A1 | 6/2010 | Bradin | |
| 2010/0258447 A1 | 10/2010 | Fan | |
| 2010/0331170 A1 | 12/2010 | Balagopal et al. | |
| 2011/0024288 A1 | 2/2011 | Bhavaraju et al. | |
| 2011/0027848 A1 | 2/2011 | Karanjikar et al. | |
| 2011/0035995 A1 | 2/2011 | Busch | |
| 2011/0111475 A1 | 5/2011 | Kuhry et al. | |
| 2011/0168569 A1 | 7/2011 | Bhavaraju et al. | |
| 2011/0226633 A1 | 9/2011 | Bhavaraju et al. | |
| 2011/0240484 A1 | 10/2011 | Pendleton et al. | |
| 2012/0035403 A1 | 2/2012 | Flytzani-Stephanopoulos et al. | |
| 2012/0142945 A1 | 6/2012 | Hwang et al. | |
| 2012/0194005 A1 | 8/2012 | Bhavaraju et al. | |
| 2012/0316093 A1 | 12/2012 | Zhan et al. | |
| 2013/0001095 A1 * | 1/2013 | Bhavaraju et al. | 205/340 |
| 2013/0186770 A1 | 7/2013 | Mosby et al. | |
| 2013/0284607 A1 | 10/2013 | Bhavaraju et al. | |
| 2014/0154766 A1 | 6/2014 | Karanjikar et al. | |

FOREIGN PATENT DOCUMENTS

| | | | | |
|---|---|---|---|---|
| EP | 838435 A1 * | 4/1998 | | C02F 1/66 |
| GB | 787976 A * | 12/1957 | | |
| JP | 06271499 | 9/1994 | | |
| SU | 979325 | 12/1982 | | |
| WO | WO-2007/095215 | 8/2007 | | |

OTHER PUBLICATIONS

Hongyou, et al., "English Language Abstract", CN101089231A, (Dec. 19, 2007),1.

Le, Zhikang "Chinese Office Action", Chinese Application No. 201080024541.8, (Jan. 21, 2014),1-10.

Park, Sang H., "International Search Report", PCT Application No. PCT/US2011/033626 (corresponding to U.S. Appl. No. 13/092,685), Feb. 8, 2012, 1-3.

Park, Sang H., "Written Opinion of the International Searching Authority", PCT Application No. PCT/US2011/033626 (corresponding to U.S. Appl. No. 13/092,685, (Feb. 8, 2012),1-4.

Paul, et al., "Reactions of Sodium Metal with Aromatic Hydrocarbons", *J. Am. Chem. Soc.*, 1956, 78 (1), (Jan. 1956),116-120.

Dzik, et al., "Carboxylates as sources of carbon nucleophiles and electrophiles: comparison of decarboxylative and decarbonylative pathways", *Chemical Science*, 2012, vol. 3, Issue No. 9 (2012), (May 3, 2012),2671-78.

Mendez, Zulmariam "Final Office Action", U.S. Appl. No. 12/840,401, (Mar. 15, 2013),1-12.

Wong, Edna "Non Final Office Action", U.S. Appl. No. 12/840,913, (Mar. 28, 2013), 1-31.

Sekine, !Sao et al., "Effect of the Concentration of Acetate or Propionate on the Abnormal Phenomena in the Kolbe Reaction", Denki Kagaku, vol. 41(9), (1973), 702-707.

Wong, Edna "Non Final Office Action", U.S. Appl. No. 13/357,463, (Apr. 9, 2013),1-21.

Mendez, Zulmariam "Non Final Office Action", U.S. Appl. No. 12/840,401, (Jul. 30, 2013), 1-15.

Wong, Edna "Final Office Action", U.S. Appl. No. 12/840,913.

Wong, Edna "Notice of Allowance", U.S. Appl. No. 12/840,508, (Apr. 29, 2013),1-11.

Conway, et al., "New Approaches to the Study of Electrochemical Decarboxylation and the Kolbe Reaction. I. The Model Reaction with Formate", *Canadian Journal of Chemistry* (no month, 1963), vol. 41, (1963),21-37.

Wong, Edna "Final Office Action", U.S. Appl. No. 12/840,913, (Aug. 14, 2012),1-28.

Wong, Enda "Notice of Allowance", U.S. Appl. No. 12/840,913, (Oct. 4, 2013),1-11.

Wong, Edna "Final Office Action", U.S. Appl. No. 13/357,463, (Sep. 6, 2013),1-16.

Wong, Edna "Non-Final Office Action", U.S. Appl. No. 13/612,192, (Dec. 10, 2013),1-33.

Wong, Edna "Final Office Action", U.S. Appl. No. 13/357,463, (Dec. 10, 2013),1-33.

Wong, Edna "Final Office Action", U.S. Appl. No. 12/840,508, (Nov. 27, 2012),1-25.

Palit, Santi R., "The Solubility of Soaps and of Some Salts in Mixtures of Solvents, One of Which Is of Glycolic Type", *Utah Consortia UALC*, vol. 69, (Dec. 1947),3120-29.

Park, Sang Ho "PCT International Search Report", Int. App. No. PCT/US2010/042715, (Apr. 29, 2011),1-3.

Park, Sang Ho "PCT Written Opinion", Int. App. No. PCT/US2010/042715, (Apr. 29, 2011),1-4.

Kang, Sang Yoon "PCT International Search Report", Int. App. No. PCT/US2010/042756, (Feb. 28, 2011),1-3.

Kang, Sang Yoon "PCT Written Opinion", Int. App. No. PCT/US2010/042756, (Feb. 28, 2011),1-4.

Park, Sang Ho "PCT International Search Report", Int. App. No. PCT/US2010/042780, (May 2, 2011),1-3.

Park, Sang Ho "PCT Written Opinion", Int. App. No. PCT/US2010/042780, (May 2, 2011),1-4.

Bozell, Joseph J., "Connecting Biomass and Petroleum Processing with a Chemical Bridge", *Science*, (Jul. 30, 2010),vol. 329: 522-523.

Bond, Jesse Q., et al., "Integrated Catalytic Conversion of gamma-Valerolactone of Liquid Alkenes for Transportation Fuels", *Science*, (Feb. 26, 2010),vol. 327: 1110-1114.

Chum, H L., et al., "Photoelectrochemistry of Levulinic Acid on Undoped Platinized n-TIO2 Powders", *J. Phys. Chem*, (1983),vol. 87: 3089-3093.

Schafer, Hans-Jurgen "Recent Contributions of Kolbe Electrolysis to Organic Synthesis", *Topics in Current Chemistry*, (1990),vol. 152: 91-151.

Rabjohn, et al., "Kolbe Electrosynthesis of Alkanes with Multiple Quaternary Carbon Atoms", *J. Org. Chem.*, (1981),vol. 46, pp. 4082-4083.

Wong, Edna "USPTO Office Action", U.S. Appl. No. 12/840,508, (Nov. 2, 2011),17 pages.

Kobzeva, et al., "Effect of a solvent on anode processes", *Elektrokhimiya*, vol. 11. No. 5 (1975),1 page abstract.

Ono, et al., "Electrolysis of fatty acids I", *Ind. Chem. Sect. 53*, (1950),1 page abstract.

Minami, et al., "Electrolysis of Fatty Acids II", *Kogyo Kagaku Zasshi*, vol. 53, (1950), 1 page abstract.

Obermuller, "Saponification by Sodium Ethoxide", *J Chem. Soc.*, Abstr. 62, (1892),1 page abstract .

Wong, Edna "USPTO Office Action", U.S. Appl. No. 12/840,913, (Nov. 16, 2011),16 pages.

Wong, Edna "Non-Final Office Action", U.S. Appl. No. 12/840,508, (Apr. 26, 2012),1-32.

Wong, Edna "Non-Final Office Action", U.S. Appl. No. 12/840,913, (Apr. 10, 2012),1-12.

Mendez, Zulmariam "Non-Final Office Action", U.S. Appl. No. 12/840,401, (Jun. 5, 2012),1-12.

(56) References Cited

OTHER PUBLICATIONS

Wong, Edna "Non-Final Office Action", U.S. Appl. No. 13/357463, (Jun. 4, 2012),1-25.
Pande, et al., "Studies on Kolbe's Electrosynthesis", *Electrochimica Acta*, Aug. 1961, vol. 4, (Aug. 1961),215-231.
Ho, Park S., "International Search Report", PCT US 2011/035782 (corresponding to U.S. Appl. No. 13/103,716, (Feb. 9, 2012),1-3.
Ho, Park S., "Written Opinion of the International Searching Authority", PCT US 2011/035782 (corresponding to U.S. Appl. No. 13/103,716, (Feb. 9, 2012),1-4.
Ko, et al., "Computer Translation of the Detailed Description of JP 6-271499", Japanese Patent publication 06-271499, (Sep. 27, 1994),1-8.
Aslanov, N. N. "English Language Bibliographical Information and Abstract", SU Patent No. 979325, (Dec. 7, 1982),1-3.
Choi, et al., "Recovery of lactic acid from sodium lactate by ion substitution using ion-exchange membrane", *Separation and Purification Technology 28 (2002)*, Elsevier, (Mar. 4, 2002),69-79.
Habova, et al., "Application of Electrodialysis for Lactic Acid Recovery", *Czech J. Food Sci.*, vol. 19, No. 2 (2001), (Jan. 1, 2001),73-80.
Huang, et al., "Application of electrodialysis to the production of organic acids: State-of-the-art and recent developments", *Journal of Membrane Science 288 (2007)*, Elsevier, (Nov. 25, 2006),1-12.
Lu, et al., "Modeling of the mass transfer and conduction behavior in electro-electrodialysis with oil/water emulsion as the catholyte", *Journal of Membrane Science 322 (2008)*, Elsevier, (Jun. 5, 2008),265-274.
Moon, et al., "Competitive Anion Transport in Desalting Mixtures of Organic Acids by Batch Electrodialysis", *Journal of Membrane Science 141 (1998)*, Elsevier, (Apr. 1, 1998),75-89.
Palaty, et al., "Continuous dialysis of carboxylic acids. Permeability of Neosepta-AMH membrane", *Desalination 216 (2007)*, Elsevier, (Oct. 1, 2007),345-355.
Prado Rubio, et al., "Modeling Reverse Electro-Enhanced Dialysis for Integration with Lactic Acid Fermentation", *CAPEC, Department of Chemical and Biochemical Engineering Technical University of Denmark (DTU)*, DK-2800 Lyngby, Denmark, 2009, Available as "A-DK-Prado Rubio-OA-1" at Docstoc.com, http://www.docstoc.com/search/modeling%20reverse%20electro~enhanced% 20dialysis% 20for%20integration%20with%20lactic%20acid%20 fermentation?catid=0,(Jan. 1, 2009),1-2.
Yi, et al., "An in situ coupling separation process of electro-electrodialysis with back-extraction", *Journal of Membrane Science 255 (2005)*, Elsevier, (Mar. 21, 2005),57-65.
Mendez, Zulmariam "Non-Final Office Action", U.S. Appl. No. 13/790,744, (Mar. 20, 2014),1-22.
Mendez, Zulmariam "Final Office Action", U.S. Appl. No. 12/840,401, (Mar. 13, 2014),1-23.
Wong, Edna "Non-Final Office Action", U.S. Appl. No. 13/612,192, (Apr. 8, 2014),1-24.
Wong, Edna "Final Office Action", U.S. Appl. No. 13/357,463, (Sep. 19, 2012),1-17.
Keeling, Alexander W., "Non-Final Office Action", U.S. Appl. No. 13/092,685, (May 20, 2014),1-20.
Kim, Su M., "International Search Report", PCT Application No. PCT/US2014/020786 (Corresponding to U.S. Appl. No. 14/198,026), (Jun. 26, 2014),1-3.
Kim, Su M., "Written Opinion of the International Searching Authority", PCT Application No. PCT/US2014/020786 (Corresponding to U.S. Appl. No. 14/198,026.), (Jun. 26, 2014),1-3.
Mendez, Zulmariam "Non-Final Office Action", U.S. Appl. No. 12/840,401, (Aug. 26, 2014),1-18.
Wong, Edna "Final Office Action", U.S. Appl. No. 13/612,192, (Aug. 15, 2014),1-18.
Wong, Edna "Non-Final Office Action", U.S. Appl. No. 13/930,211, (Jul. 23, 2014),1-43.
Klocke, et al., "Influences on the Selectivity of the Kolbe versus the Non-Kolbe Electrolyis in the Anodic Decarboxylation of Carboxylic Acids", *Electroorganic Svthesis*, (Nov. 2, 1992),1-8.
"International Search Report", PCT Application No. PCT/US2014/ 028842 (Corresponding to U.S. Appl. No. 13/834,569), (Aug. 14, 2014),1-3.
Shin, JU C., "Written Opinion of the International Searching Authority", PCT Application No. PCT/US2014/028842 (Corresponding to U.S. Appl. No. 13/834,569), (Aug. 14, 2014),1-7.
Shin, Ju C., "International Search Report", PCT/US2014/021927 (Corresponding to U.S. Appl. No. 13/790,744), (Jul. 10, 2014),1-3.
Shin, JU C., "Written Opinion of the International Searching Authority", PCT/US2014/021927 (Corresponding to U.S. Appl. No. 13/790,744), (Jul. 10, 2014),1-7.
Wong, Edna "Non-Final Office Action", U.S. Appl. No. 13/612,192, (Dec. 5, 2014),1-37.
Glasstone, et al., "Studies in Electrolysis Oxydation Part V11. The Electrolysis of Acetates in Non-Aqueous Solutions.", *J. Chem. Soc.*, (Jan. 1, 1936),820-827.
Wong, Edna "Final Office Action", U.S. Appl. No. 13/930,211, (Nov. 21, 2014),1-32.
Wong, Edna "Non-Final Office Action", U.S. Appl. No. 14/198,026, (Nov. 14, 2014),1-20.
Mendez, Zulmariam "Non-Final Office Action", U.S. Appl. No. 13/790,744, (Nov. 4, 2014), 1-11.

\* cited by examiner

METHOD AND DEVICE FOR CARBOXYLIC ACID PRODUCTION

RELATED APPLICATION

This application claims the benefit of U.S. Provisional Patent Application Ser. No. 61/371,113 filed Aug. 5, 2010, entitled "Method and Device for Carboxylic Acid Production." This provisional application is expressly incorporated herein by reference.

TECHNICAL FIELD

The present disclosure relates to a method of forming lactic acid (or other carboxylic acids) using an electrolysis cell. More specifically, the present disclosure relates to forming lactic acid (or other carboxylic acids) using an electrolysis cell without having the cell's solid ion conducting membrane (e.g., NaSICON membrane) be fouled (poisoned) by the formed acid.

BACKGROUND

Lactic acid is a common chemical encountered in foodstuffs, medicines and other products. Lactic acid is a naturally occurring chemical and has the formula $CH_3CH(OH)COOH$. The corresponding lactate anion has the formula $CH_3CH(OH)COO^-$ However, for convenience, lactic acid and the lactate anion are often represented by their stoichiometric formulas, namely $C_3H_6O_3$ and $C_3H_5O_3^-$.

Lactic acid is a desirable product because it may be converted into a biodegradable polymer that may be used to form bottles and other useful products. Accordingly, the market for lactic acid is continuously growing. There are known ways to make lactic acid, including using gypsum as a reactant.

Various attempts have been made to produce lactic acid using electrolysis (e.g., in an electrolysis cell). In general, this reaction involves sodium lactate aqueous solution (under the influence of an applied voltage) to produce lactic acid at the cell's anode. This chemical oxidation reaction of the cell's anolyte solution is represented as follows:

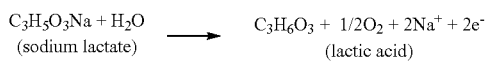

In many electrolytic cells designed to accomplish this conversion of lactate anion to lactic acid, a solid ion conducting membrane, such as a NaSICON membrane, is used. During the chemical reaction, the produced sodium ions ($Na^+$) flow through the cell's membrane (e.g., towards the cathode). However, lactic acid is an organic acid, and as such, the lactic acid produced in this reaction would decrease the pH of the anolyte solution. This decrease in the pH operates to stop the conduction of the sodium ions through the membrane. This is referred to as "poisoning" or "fouling" of the membrane. Once the pH of the anolyte reaches a certain acidic level, the sodium ions can no longer flow through the membrane and the formation of lactic acid in the cell ceases.

It should be noted that although the prior example was given with respect to lactic acid, attempts have been made to form other carboxylic acids (such as, for example, citric acid, oleic acid, adapic acid, decanoic acid, etc.) from their corresponding alkali salts using similar reactions in electrolysis cells. However, as all of these carboxylic acids are acidic chemicals, these electrolytic chemical reactions also suffer from a similar type of "poisoning" of the membrane that was described above. Accordingly, there is a need in the art for a new type of electrolysis cell that can be used to form lactic acid (or another type of carboxylic acid), wherein the membrane will not be poisoned (fouled) by the production of the acid. Such a new type of electrolytic cell is disclosed herein.

SUMMARY

The present embodiments address the acidic poisoning of a membrane (such as a NaSICON membrane) in an electrolysis cell by using a two phase electrolysis approach. The present embodiments use a mixture of aqueous (or more polar) and non-aqueous (or less polar) solvents in the anolyte. In one embodiment, the lactic acid (or another carboxylic acid) that is produced in the anolyte is removed into the non-aqueous (organic) second phase. The second phase (organic phase) therefore preferentially absorbs the lactic acid from the aqueous phase, leaving sodium lactate anions in the aqueous phase. This phenomenon is called partitioning. More specifically, sodium lactate, which is more polar than lactic acid, prefers the polar solvent (water) while lactic acid, which is less polar, prefers a less polar or non-polar (organic) solvent. The lactic acid that migrates into the non-aqueous (non-polar) phase will not dissociate to form $H^+$ ions. As a result, the pH of the anolyte in the aqueous phase is generally governed by the presence of the lactate anion (which is a basic entity). The pH of the anolyte thus does not substantially drop upon the formation of the lactic acid and as such, the lactic acid will not poison the NaSICON membrane. Rather, the cell operates at the basic (or perhaps neutral) pH and the membrane conducts the sodium ions into the catholyte until all the sodium lactate is consumed.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the present invention, as represented in the Figures, is not intended to limit the scope of the invention, as claimed, but is merely representative of embodiments of the invention.

Figure 1:
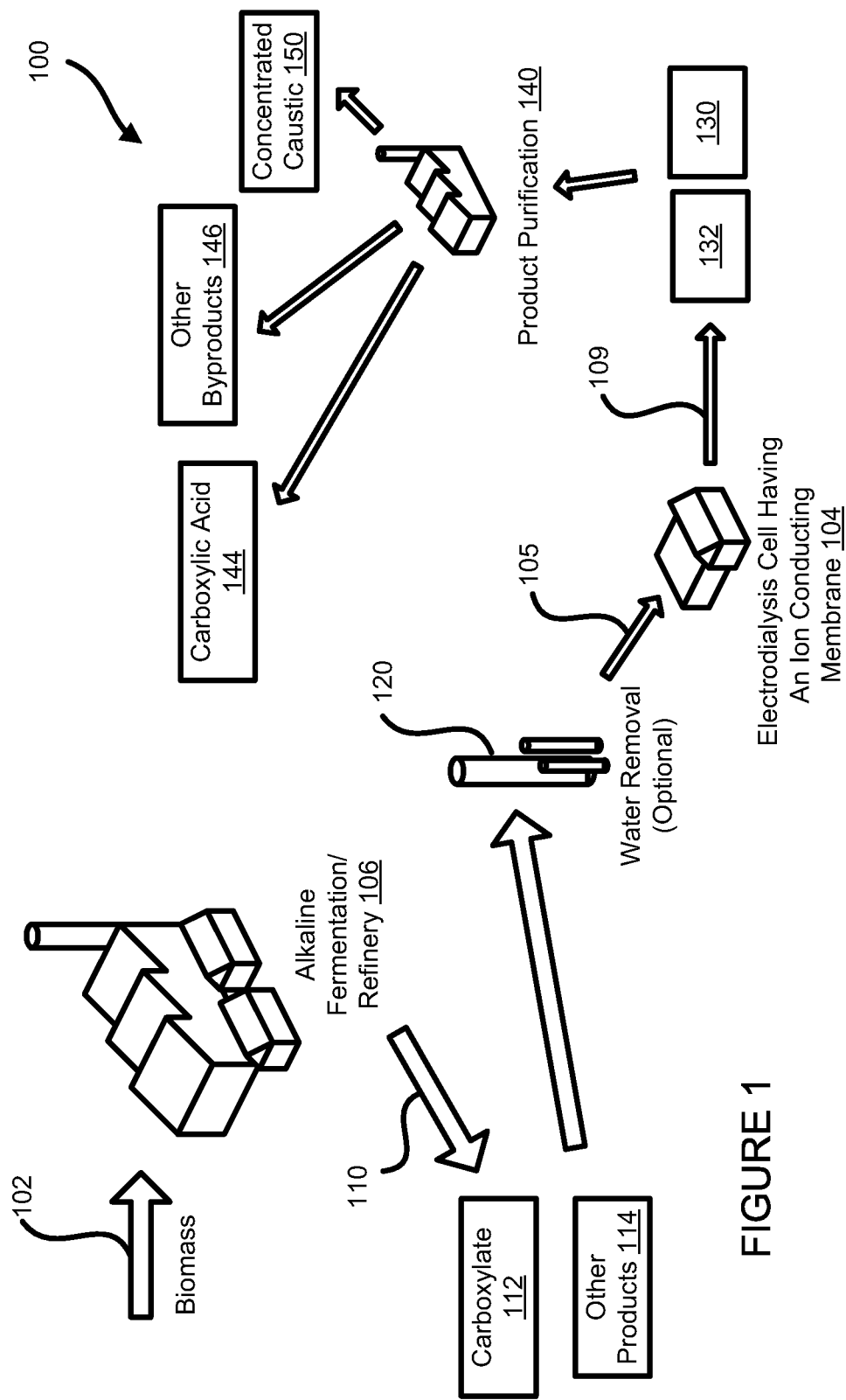
FIG. 1 shows a flow diagram of a method of producing carboxylic acids (and other products) from biomass.

With respect to FIG. 1, an overall process 100 is shown for producing a carboxylic acid. As will be described, the process 100 produces a carboxylic acid in an electrolysis cell 104. The electrolysis cell 104 has an ion conducting membrane. The process 100 begins by obtaining the corresponding anion for the carboxylic acid. In some embodiments, this anion may be obtained from a quantity of biomass 102. Obviously, given its abundance in nature, it is desirable to find a way to use this biomass as a starting material to form a useable carboxylic acid product. As used herein, "biomass" 102 may comprise, for example, carbohydrates, lipids (such as fats or oils), lignins, tall oil and/or resins from plant, algal, or animal origin. Other examples of biomass include wood chips, forestry residue, energy crops (switch grass, miscanthus, sorghum, energy cane and other genetically modified plants), algae, cyanobacteria, jatropha, soy bean, corn, palm, coconut, canola, rapeseed, Chinese tallow, animal fats products of genetically modified organisms, and the like.

As indicated above, the biomass 102 may be from algal, animal, microbial, or plant origins (such as wood, etc.). In one embodiment, any type of biomass may be used, whether the source of this biomass 102 is natural, synthetic, man-made, or even genetically altered (such as in the case of microbes, microorganisms, or animals). If the biomass is from an algal material, the algae may be synthesized, genetically-altered, or may be naturally occurring. Mixtures of different types of biomass may also be used. As explained in detail herein, the biomass 102 may be used as a starting material to ultimately arrive at a carboxylic acid (such as, for example, lactic acid).

As shown in FIG. 1, the quantity of the biomass 102 may be obtained. This biomass 102 may be converted 110 into an alkali salt of a carboxylic acid 112 (which may be also referred to as a "carboxylate"). Other products 114 may also be formed. In some embodiments, this conversion 110 of the biomass 102 may involve an alkaline fermentation reaction and may occur at an alkaline fermentation refinery 106 or at another similar facility. Other processing steps, either in addition to or in lieu of the fermentation reaction (e.g. hydrolysis of biomass in alkaline media), may also be used to produce the carboxylate 112. Those skilled in the art are familiar with the steps, chemical processes, treatments, etc., that are necessary to form the carboxylates 112 from biomass 102. In some embodiments, the alkali salt of a carboxylic acid 112 will be a sodium salt.

The alkali salt of a carboxylic acid 112 and/or the other products 114 may optionally be subjected to a water removal step 120 and/or other processing. Once the alkali salt of a carboxylic acid 112 has been processed, it may be added 105 to the electrolysis cell 104 (having the ion conducting membrane.) The process 109 that is used by the cell 104 is described herein in greater detail. This process 109 forms a carboxylic acid 130 as well as other usable products 132. The carboxylic acid 130 and the other products 132 may then undergo a purification step 140 to produce a concentrated supply of the carboxylic acid 144, other byproducts 146 and a concentrated supply of caustic 150 (such as NaOH). The steps associated with the purification 140 are known to a skilled artisan and some of these steps are described herein.

Further, as will be described in greater detail in conjunction with FIGS. 2 and 3, the electrolysis cell 104 may be a multi-compartment electrolysis cell 104 that uses an organic phase to separate the formed carboxylic acid from an aqueous phase.

Figure 2:
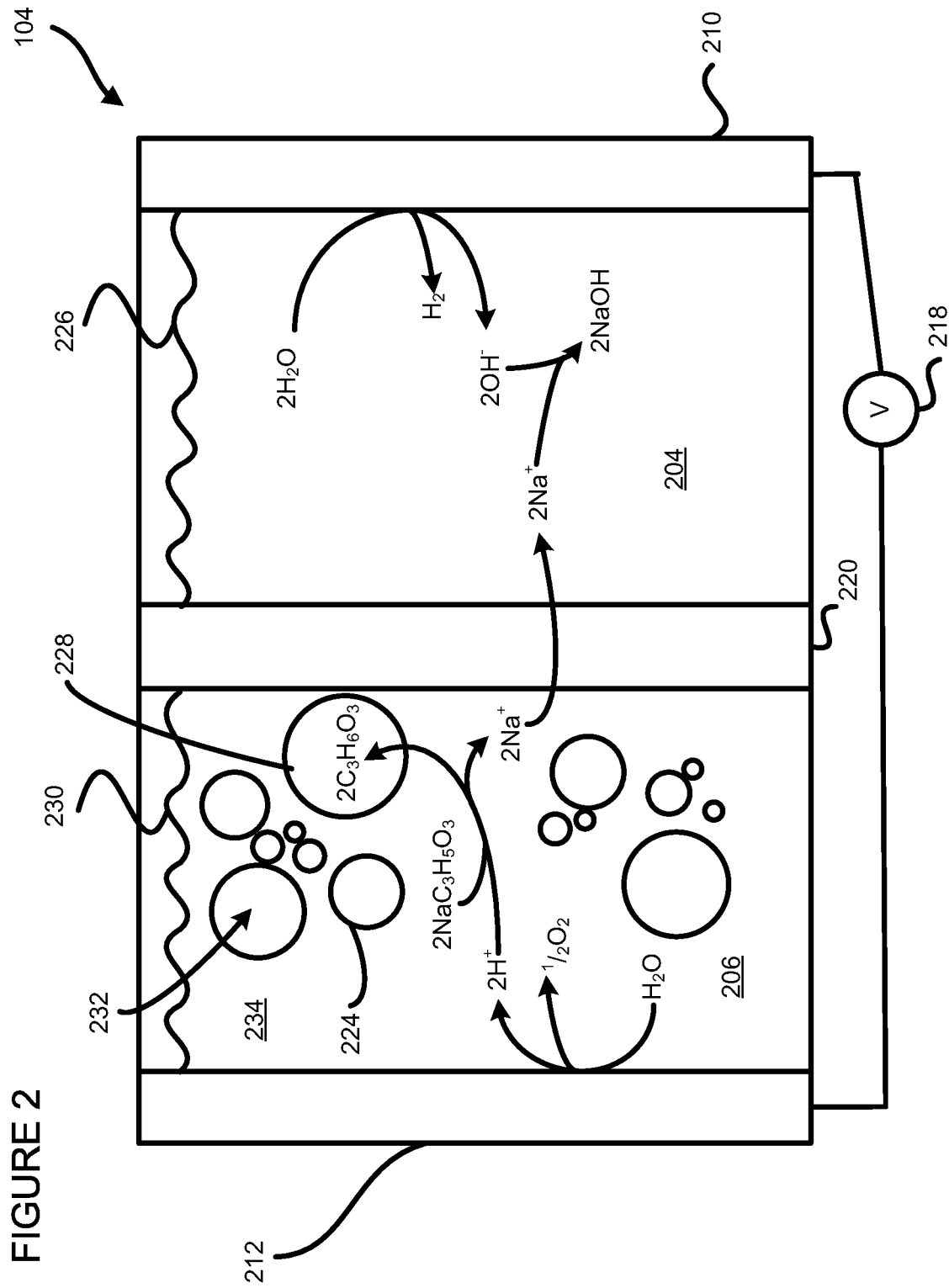
FIG. 2 shows a schematic diagram of a multi-compartment electrolysis cell according to the present embodiments.

Referring now to FIG. 2, an exemplary embodiment of an electrolysis cell 104 is illustrated. The electrolysis cell 104 may be used to convert biomass to a carboxylic acid. Specifically, the electrolysis cell 104 may be a multi-compartment electrolysis cell. Accordingly the cell 104 may comprise two separate compartments, namely a cathodic compartment 204 and an anodic compartment 206. The cathodic compartment 204 may be in communication with a cathode 210. In some embodiments, the cathode 210 may be wholly located within the cathodic compartment 204. In other embodiments, at least part of the cathode 210 is not located within the cathodic compartment 204. The anodic compartment 206 may be in communication with an anode 212. In some embodiments, the anode 212 may be wholly located within the anodic compartment 206. In other embodiments, at least part of the anode 212 is not located within the anodic compartment 206. Those skilled in the art will appreciate how to construct the cathode 210, the anode 212, the cathodic compartment 204 and/or the anodic compartment 206 so that an electrolysis (electrolytic) reaction may occur within the electrolysis cell 104. A power source 218 is in communication with the anode 212 and the cathode 210 and operates to create a current between the cathode 210 and the anode 212 (e.g., an applied current within the cell 104 to generate current or vice-versa).

The electrolysis cell 104 may further comprise a solid alkali ion transporting membrane 220. The solid alkali ion transporting membrane 220 may separate the anodic compartment 206 from the cathodic compartment 204. In many embodiments, the solid alkali ion transporting membrane 220 may be capable of transporting alkali metal ions from the anodic compartment 206 to the cathodic compartment 204. In some embodiments where the alkali metal is sodium, the membrane 220 may be a NaSICON membrane. NaSICON is a material known in the art and may be used to form the membrane. Some NaSICON membranes are commercially available from Ceramatec, Inc., of Salt Lake City, Utah. NaSICON typically has a relatively high ionic conductivity for sodium ions at room temperature. Alternatively, if the alkali metal is lithium, then a particularly well suited material that may be used to construct an embodiment of the membrane is LiSICON. Alternatively, if the alkali metal is potassium, then a particularly well suited material that may be used to construct an embodiment of the membrane is KSICON. Other examples of such solid electrolyte membranes include those membranes based on the NaSICON structure, sodium conducting glasses, beta alumina and solid polymeric sodium ion conductors. Such materials are commercially available. Moreover, such membranes are tolerant of impurities that may be in the anolyte and will not allow the impurities to mix with the catholyte. Thus, the impurities (which may be derived from the biomass) do not necessarily have to be removed prior to placing the anolyte in the cell 104. Likewise, such membranes may also be desirable because they are not subject to degradation by polymers, as is possible with other types of polymer membranes.

The electrolysis cell 104 may comprise an anolyte 230 and a catholyte 226. The catholyte 226 may comprise an aqueous solution. The catholyte 226 may be housed, at least partially, within the cathodic compartment 204. The anolyte 230 may be housed, at least partially, within the anodic compartment 206. The anolyte 230 comprises a first solvent 234 and a second solvent 232. The two solvents 232, 234 are generally immiscible or partially immiscible such that they separate out from each other. Examples of the types of solvents that may be used comprise water and an organic solvent (such as, for example, hexanol cyclohexanol, octonal, or butanol). Of course, other types of organic solvents may also be used. The first solvent 234 may comprise water (or an aqueous phase) whereas the second solvent 232 may comprise an organic solvent. The anolyte 230 may also comprise a quantity of an alkali salt of a carboxylic acid 224 (which, as noted above, may be derived from biomass).

The chemical reactions that occur within the anodic compartment 206 and cathodic compartment 204 (based upon the voltage applied by the source 218) will now be described. In this example, the alkali metal is sodium and the alkali salt of a carboxylic acid 224 is sodium lactate:

Basic Anolyte Reactions within the Anodic Compartment:

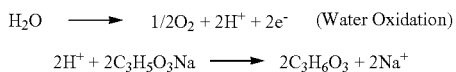

Basic Catholyte Reactions within the Cathodic Compartment:

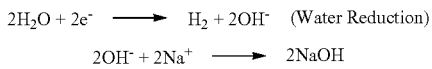

As can be seen from these reactions, water ($H_2O$) is oxidized on the anode 212 to release oxygen gas ($O_2$) and protons ($H^+$). These protons ($H^+$) then react with sodium lactate ($C_3H_5O_3Na$) to form free sodium ions ($Na^+$) and lactic acid ($C_3H_6O_3$). The sodium ions ($Na^+$) may be transported across the NaSICON membrane 220, while the lactic acid ($C_3H_6O_3$) 228 may be partitioned into the second solvent 232 (organic phase) of the anolyte 230. The acid 228 may be partitioned into the second solvent 232 based on its solubility preference for this organic phase. (This extraction is described as happening within the electrolytic cell 104, although in some embodiments, the extraction occurs partially or wholly outside of the cell.)

This liquid-liquid extraction reduces pH effects on the anolyte 230 (caused by the formation of the acid 228) and protects the NaSICON membrane. More specifically, when the lactic acid 228 partitions into the second solvent 232, the lactic acid 228 does not dissociate into $H^+$ ions and lactate anions. Rather, the lactic acid remains in its neutral (molecular) form in the organic phase. Further, when the lactic acid 228 partitions into the second solvent 232, the alkali salt of a carboxylic acid 224 (e.g., sodium lactate) is left in the first solvent 234 (e.g., the water or aqueous phase). The alkali salt of a carboxylic acid 224 is a basic chemical, and as such, the pH of the anolyte 230 does not drop to an acidic level upon the formation of the acid 228. NaSICON membranes have been known to foul or be poisoned in an acidic pH, such as, for example, a pH of 6 or lower. However, by maintaining the anolyte 230 at a basic pH (due to the presence of the alkali salt of a carboxylic acid 224), the anolyte 230 does not achieve an acidic pH and the NaSICON membrane 220 is not fouled.

By separating the first solvent 234 from the second solvent 232, the carboxylic acid 228 may be extracted and isolated. This separation may occur by removing the anolyte 230 from the cell 104 (after it has been electrolyzed). (Alternatively, the separation of the first solvent 234 and the second solvent 232 may occur within the cell 104.) Once removed, the water and organic phases may be easily separated via known techniques. The carboxylic acid 228 may then be recovered (separated) from the organic second solvent 232, thereby achieving a supply of the desired carboxylic acid 228. After the carboxylic acid 228 has been recovered, the anolyte 230 that was removed from the cell 104 may be returned (re-fed) into the cell 104 so that the cell 104 may be reused. In one embodiment, after the carboxylic acid 228 has been recovered, the second solvent, devoid of carboxylic acid product, is recombined with the first solvent to remake the anolyte 230 that may be returned (re-fed) into the cell 104 so that the cell 104 may be reused. Those skilled in the art will appreciate that the separation process(es) used to separate the water and the organic solvent may be implemented as a continuous process, wherein sodium carboxylate is continuously being added to the anolyte and/or first solvent and the anolyte is re-fed into the cell 104 and carboxylic acid is continuously recovered.

In the reaction that occurs in the anolyte 230, sodium ions ($Na^+$) are produced. These sodium ions ($Na^+$) may be transported across the NaSICON membrane 220 and enter the catholyte 226. Once in the catholyte 226, the sodium ions ($Na^+$) may react with hydroxide ions ($OH^-$) (which were formed during water ($H_2O$) reduction on the cathode 210) to form pure caustic (NaOH). Hydrogen gas ($H_2$) may also be formed in the cathodic compartment 204.

Figure 3:
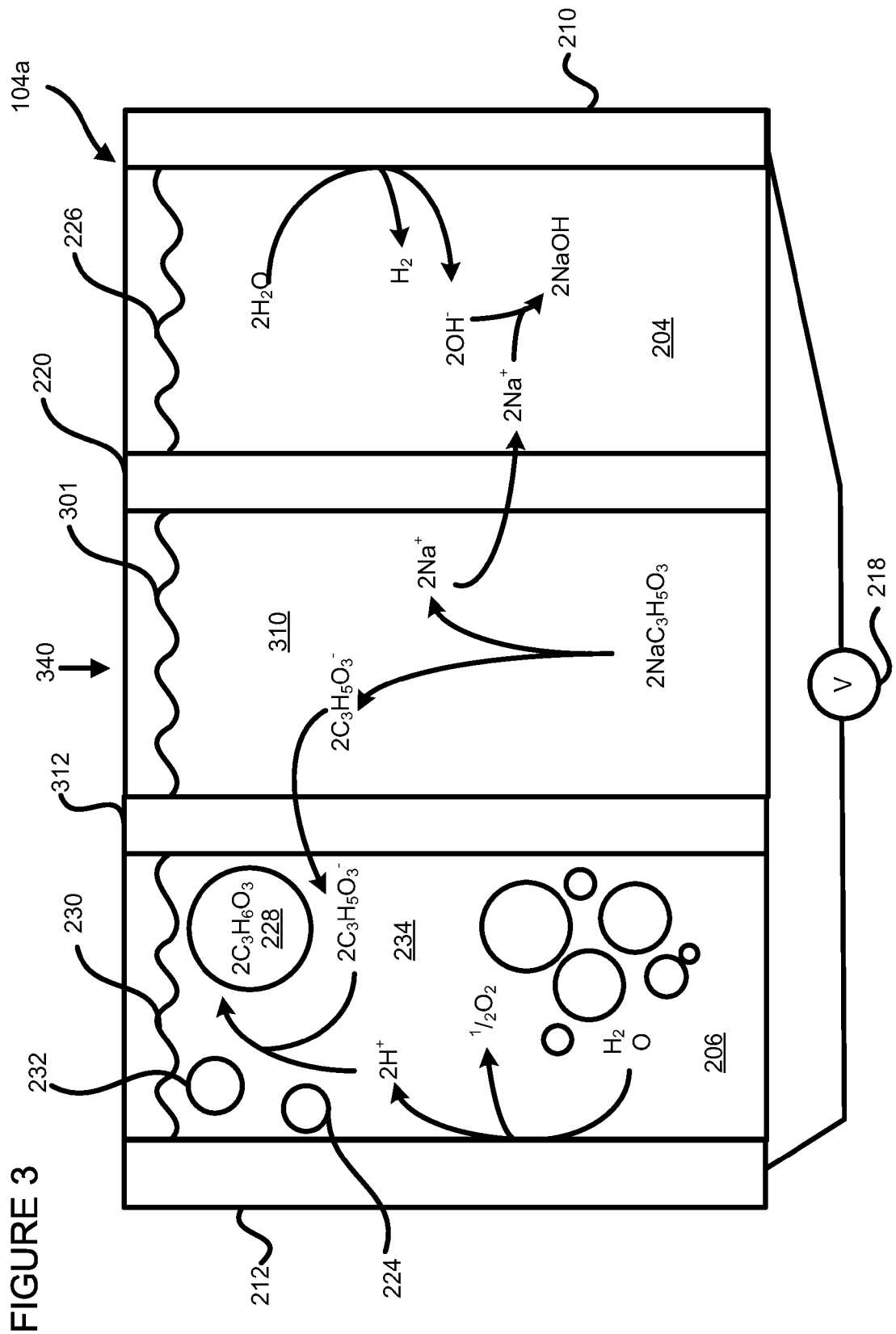
FIG. 3 shows a schematic diagram of another embodiment of a multi-compartment electrolysis cell.

Referring now to FIG. 3, another exemplary embodiment of an electrolysis cell 104a is illustrated. The electrolysis cell 104a that is shown in FIG. 3 is similar to that which was shown in FIG. 2 and may be used in the process 100 of FIG. 1. Accordingly, for purposes of brevity, much of the discussion of the features/elements of FIG. 3 that are similar to that which was found in FIGS. 1 and 2 will be omitted.

Like the embodiments shown above, electrolysis cell 104a is a multi-compartment electrolysis cell. However, unlike the two-compartment cell (having a cathodic compartment and an anodic compartment) shown in FIG. 2, the electrolysis cell 104a of FIG. 3 is a three-compartment cell. Specifically, the electrolysis cell 104a comprises a cathodic compartment 204, an anodic compartment 206 as well as a middle compartment 310. The middle compartment 310 may be interposed between the cathodic compartment 204 and the anodic compartment 206. Specifically, the middle compartment 310 may be separated from the cathodic compartment 204 by the solid alkali ion transporting membrane 220 (such as, for example, the NaSICON membrane). The middle compartment 310 may be separated from the anodic compartment 206 by an anionic membrane 312. An anionic membrane 312 may allow anions to pass through (e.g., exit the middle compartment 310 and enter the anodic compartment 206), but will prevent cations from passing through the anionic membrane 312.

The electrolysis cell 104a of FIG. 3 may operate to form a carboxylic acid 228. An example of how the cell 104a may be used to create a carboxylic acid 228 will now be provided in which the alkali metal is sodium and the alkali salt of the carboxylic acid is sodium lactate ($C_3H_5O_3Na$).

In this embodiment, an inlet stream 340 enters the middle compartment 310. The introduction of this stream 340 means that there may be a liquid 301 in the middle compartment 310. This liquid 301 may contain the alkali salt of a carboxylic acid (e.g., sodium lactate). The lactate anions ($C_3H_5O_3^-$) 224 move (under the influence of the applied voltage supplied by the voltage source 218) from the middle compartment 310 through an anionic membrane 312 into the anodic compartment 206. The positively charged sodium ions ($Na^+$) are not allowed to pass through the anionic membrane 312. Instead, sodium ions ($Na^+$) move from the middle compartment 310 through the cationic NaSICON membrane 220 into the cathodic compartment 204.

The chemical reactions of the anolyte 230 within the anodic compartment 206 as well as the chemical reactions of the catholyte 226 within the cathodic compartment 204 operate identically to the process described in FIG. 2. When the sodium ions ($Na^+$) move through the NaSICON membrane 220 into the cathodic compartment 204, these cations enter the catholyte 226. Once in the catholyte 226, the sodium ions ($Na^+$) may react with hydroxide ions ($OH^-$) (which were formed during water ($H_2O$) reduction on the cathode 210) to form pure caustic (NaOH). Hydrogen gas ($H_2$) may also be formed in the cathodic compartment 204.

When the anions 224 move through the anionic membrane 312, these anions enter the anolyte 230. In the anodic compartment 206, water ($H_2O$) from the anolyte 230 is oxidized on the anode 212 to release oxygen gas ($O_2$) and protons ($H^+$). These protons ($H^+$) then react with the lactate ($C_3H_5O_3^-$) anions 224 (which have migrated from the middle compartment 310 via the anionic membrane 312) to form lactic acid 228 ($C_3H_6O_3$). The lactic acid ($C_3H_6O_3$) 228 is partitioned into the second solvent 232 (organic phase) of the anolyte 230 based on its solubility preference for this phase. While the lactic acid 228 partitions into the second solvent 232, the lactate 224 anion partitions into the first solvent 234 (e.g., the water or aqueous phase). The lactate anion 224 is a basic chemical, and as such, the pH of the anolyte 230 does not drop upon the formation of the acid 228. The lactic acid in the second solvent 232 does not dissociate and form $H^+$ and thus, the pH in the anodic compartment remains basic (or neutral) and above a pH of about 6.

In the three-compartment embodiment shown in FIG. 3, there is added protection of the NaSICON membrane (e.g., another compartment) that prevents the lowering of the pH around the NaSICON membrane. Rather, the pH of the liquid 301 in the middle compartment 310 (e.g., around the NaSICON membrane) is set by the basic lactate anion. Accordingly, the NaSICON membrane 220 in the cell 104a is not fouled.

Figure 4:
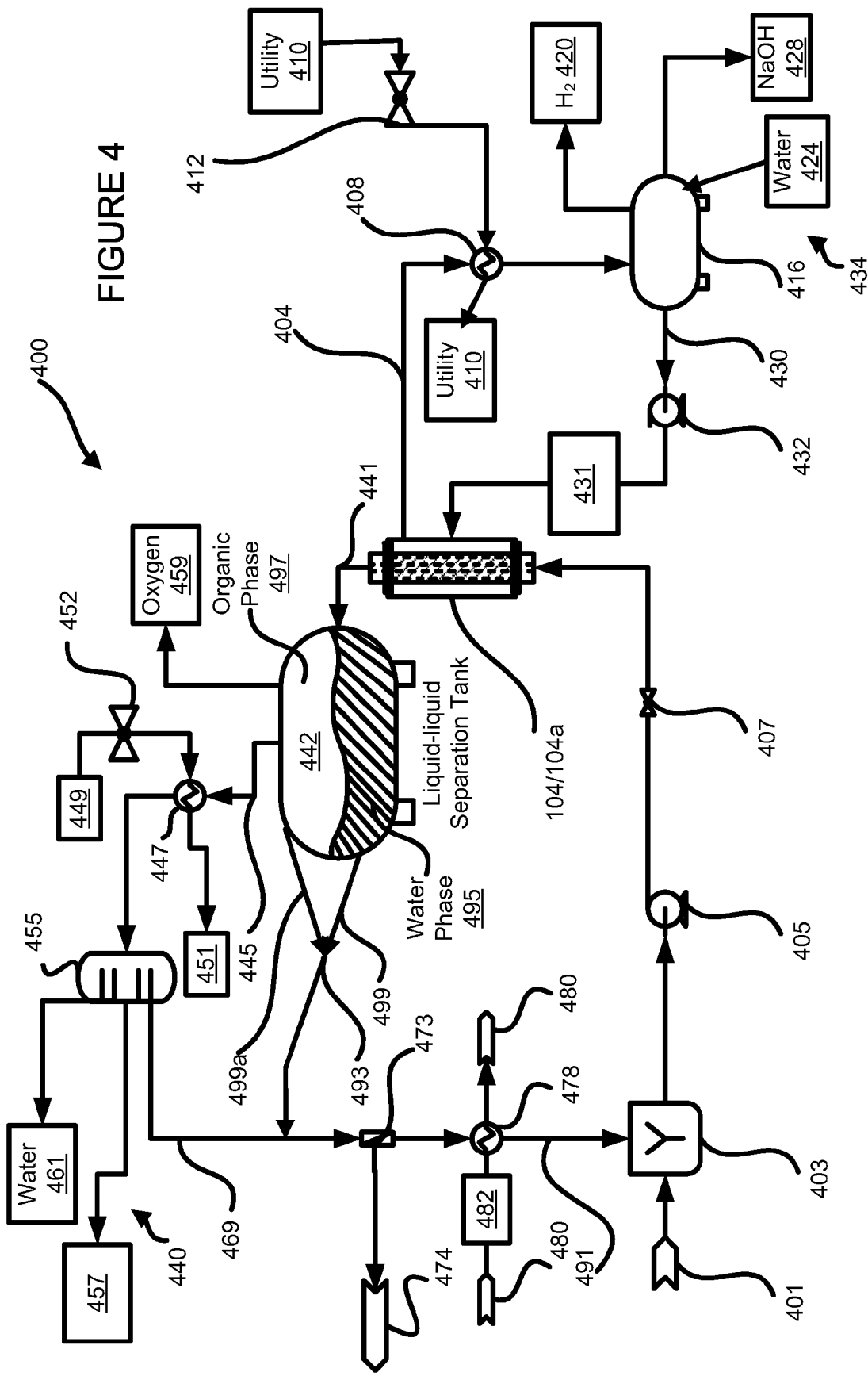
FIG. 4 shows a flow diagram of a method of producing carboxylic acids and other products using the present embodiments.
Figure 5:
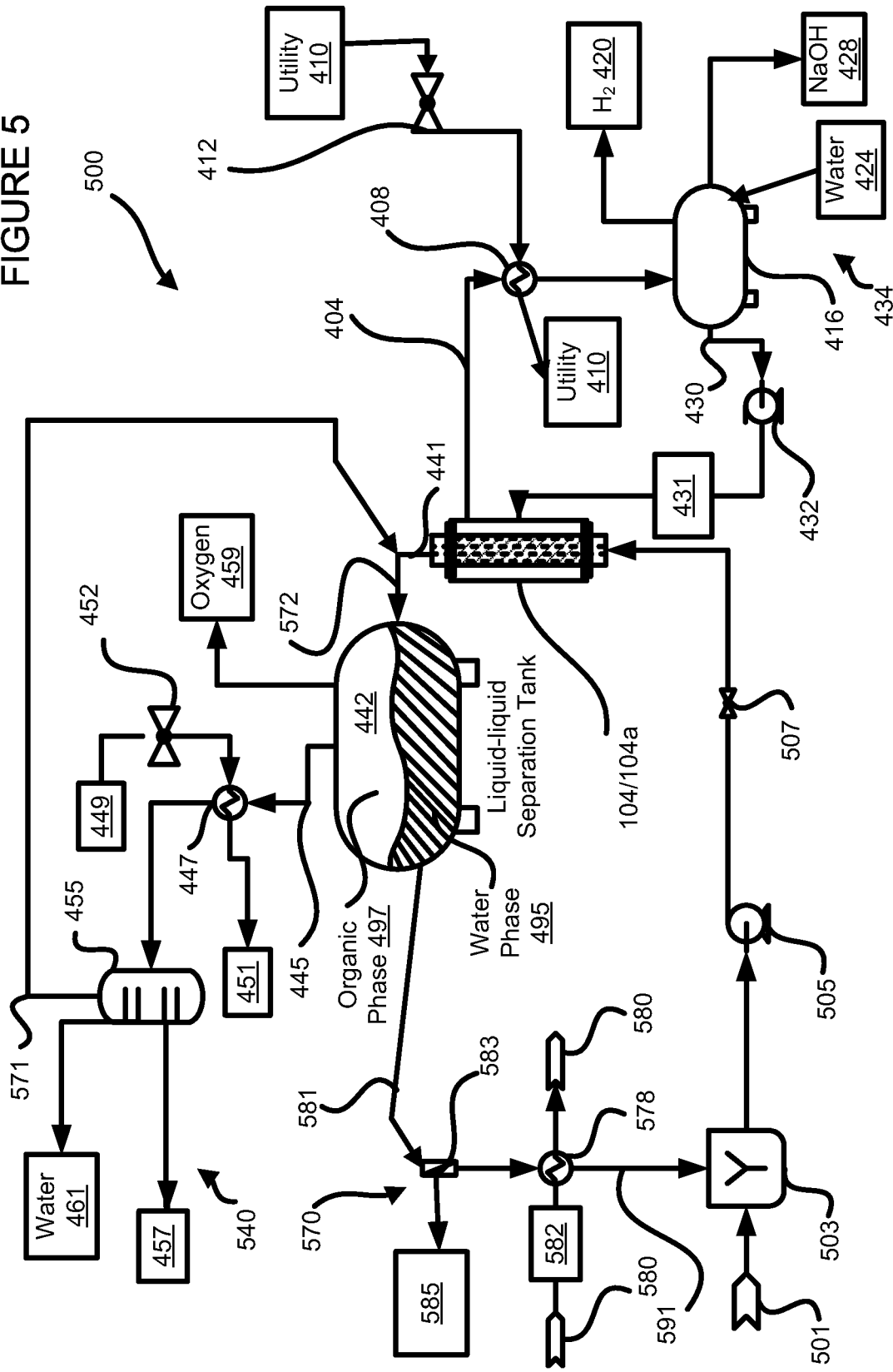
FIG. 5 is a flow diagram of another embodiment of a method of producing carboxylic acids and other products.

FIGS. 4 and 5 represent two different Process Flow Diagrams (PFD) that show continuous processes of how embodiments may be constructed and used to produce lactic acid/carboxylic acids. Both FIG. 4 and FIG. 5 show continuous processes, although both concepts could also be demonstrated using batch processes. FIGS. 4 and 5 show a possible process flow scheme in which the acid generated is separated from the water phase (e.g., the first solvent) external of the cell (e.g., in a separate liquid-liquid separation tank). However, embodiments could also be made in which no liquid-liquid separation tank is used in which the separation of the water from the organic phase occurs within the cell itself. It should be noted that the process shown in FIG. 4 provides extra protection of the NaSICON membrane from the produced acid (particularly when using a two compartment cell as shown in FIG. 2) because the acid can be removed from the water phase immediately upon its formation. On the other hand, the approach shown in FIG. 5 also has its advantages in that it does not require a well-mixed solution to enter the cell and thus could possibly require less solvent (although it may indeed require higher cell throughput).

Each PFD shown in FIGS. 4 and 5 is designed to provide control over the water/solvent ratio for a liquid-liquid extraction that occurs either inside or outside of the electrolytic cell. The ratio of water to solvent should be tailored to the specific process and solvent being used, thereby achieving maximum acid removal with minimal solvent. Theoretically, the water is only required in the process to (1) keep all sodium lactate and other inlet stream constituents dissolved and (2) provide protons ($H^+$) for the production of the acid. Thus, excess water in the anolyte may be avoided. In fact, from a practical standpoint, water removal from a post-fermentation stream may be beneficial prior to the stream entering the electrolytic process (as indicated by the water removal step 120 in FIG. 1).

Referring now to FIG. 4, a process 400 is shown that may be used to produce a carboxylic acid. In the process 400, an inlet broth 401 may be obtained. (As explained herein, this broth 401 may be derived from biomass.) The broth 401 may be added to a mixing tank 403. The inlet broth 401 may comprise the products generated by the conversion reaction 110 (for example, the fermentation reaction) of FIG. 1. A pump 405 and/or one or more valves 407 (as needed) may be used to introduce the inlet broth 401 from the mixing tank 403 into the electrolysis cell 104 (or 104a).

In the process 400, an electrolysis cell 104/104a may be used to produce a carboxylic acid. As described above, the catholyte 226 (not shown in FIG. 4) may be used to produce concentrated caustic (e.g., NaOH). Accordingly, a solution 404 of the catholyte 226 may be extracted from the cell 104/104a. This solution may then be subjected to a heat exchange/temperature exchange 408 (that may be powered by one or more utilities 410). (One or more valves 412 may be used to introduce the coolant chemicals that may be needed in the heat exchange/temperature exchange.) Those skilled in the art will appreciate the processes/conditions necessary to accomplish this heat exchange/temperature exchange 408. From this tank 416, hydrogen gas 420 may be extracted. (As noted above, hydrogen gas ($H_2$) was produced in the cathodic compartment 204 (not shown in FIG. 4), and thus, this gas 420 may be collected so that it may be sold, disposed of, re-used, etc.). Also, because water is consumed as part of the reaction in the catholyte 226, the water in the catholyte 226 may become depleted. Accordingly, water 424 may be added to the tank 416, as needed. Further, caustic (NaOH) 428 is produced in the catholyte 226, and as such, a quantity (such as a concentrated quantity) of NaOH 428 may be removed from the tank 416, as needed. (This caustic 428 may be sold, disposed of, re-used, etc.). It should be noted however, that caustic NaOH may be used in the conversion reaction 110 of FIG. 1. Accordingly, this produced caustic 428 may then be recycled and reused in that conversion reaction 110, thus lowering the overall costs associated with the present embodiments.

The catholyte 226 that is found in the catholyte recirculation tank 416 may be returned (re-fed) back 430 into the cell 104/104a, thus replenishing the supply of catholyte in the cell 104/104a. As needed, a pump 432 (and/or a valve 431) may be used to push the replenished catholyte from the tank 416 into the cell 104/104a. This processing of the catholyte 226 that was described above may be referred to as the "caustic loop" 434 of the overall process 400. This caustic loop 434 operates to replenish and renew the catholyte 226 in the cell 104/104a so that the overall process may be operated continuously. Thus, a fresh, updated supply of the catholyte 226 may continuously be present in the cell 104/104a.

In addition to a caustic loop 434, the process 400 also may include a solvent loop 440 that may be used to extract the produced carboxylic acid from the anolyte 230 (not shown in FIG. 4) and/or replenish/update the anolyte 230. As noted above, the anolyte 230 in the anodic compartment 206 (not shown in FIG. 4) may comprise a first solvent 234 (not shown in FIG. 4) and a second solvent 232 (not shown in FIG. 4). (The first solvent 234 may be water and the second solvent 232 may be an organic solvent). The alkali salt of the carboxylic acid 224 (not shown in FIG. 4) is preferentially present in the first solvent 234 and the formed carboxylic acid 228 (not shown in FIG. 4) is preferentially present in the second solvent 232. The anolyte 230 may be extracted 441 from the cell 104/104*a* and added to a liquid-liquid separation tank 442. The separation tank 442 contains a first solvent (water phase) 495 and a second solvent (organic solvent) 497. The second solvent (organic phase) 497 contains the formed carboxylic acid 228 and is separated 445 from the water 495 (first solvent).

This separated second solvent 497 may, as needed, be subjected to a heat exchange/temperature exchange reaction 447 (that may be powered by one or more utilities 449 such as steam). One or more valves 452 may be used to introduce the chemicals that may be needed in the heat exchange/temperature exchange process 447. Those skilled in the art will appreciate the processes necessary to accomplish this heat exchange/temperature exchange. The utility (such as steam) may be collected and reused 451 after this heat exchange/temperature exchange 447 has occurred.

After finishing the heat exchange/temperature exchange reaction 447, a distillation may be performed upon the second solvent 497. This distillation (or other separation process) may occur within a distillation column 455. The distillation column 455 separates out the various components from the second solvent 497. For example, the carboxylic acid 457 (such as lactic acid) that was found in the second solvent 232 may be extracted and processed further, concentrated, used, etc. Any water 461 that may have been present in the second solvent 497 may also be removed and re-used, treated, disposed of, etc. Likewise, any oxygen gas 459 (which was produced in the anolyte reaction) may also be removed from the tank 442 and collected, disposed of, sold, used, etc.

After removing these substances from the second solvent 497, the second solvent 497 may leave 469 the distillation column 455. Specifically, the second solvent 497 may then be combined with anolyte 230 that has been extracted from the liquid-liquid separation tank 416. As shown by arrows 499 and 499*a*, a portion of the water phase 495 and the organic phase 497 may be extracted from the separation tank 442 and combined 493 together. This combined flow may then be added to the flow 469 after it leaves the distillation column 455. Accordingly, the process in FIG. 4 shows an embodiment, where a two-phase liquid solution is introduced into the electrolytic cell, providing for some partitioning of the solution within the cell, and therefore possible pH buffering within the cell.

This combined liquid may then be filtered 473, as desired, to remove contaminants 474. Once filtered, this combined liquid may then be subjected to a heat exchange/temperature exchange process 478 (that may be powered by one or more utilities 480). One or more valves 482 may be used to introduce chemicals that may be needed in the heat exchange/temperature exchange. Those skilled in the art will appreciate the processes necessary to accomplish this heat exchange/temperature exchange 478. The products of this heat exchange/temperature exchange 478 may be then added 491 to the mixing tank 403 for use, and may ultimately be reused, in the cell 104/104*a*.

Thus, the process 400 represents a continuous process where the products are continuously being produced and removed from the system. Thus, a fresh, update supply of the anolyte 230 may continuously be present in the cell 104/104*a*. This process 400 also provides an external liquid-liquid extraction process using the tank 442.

Referring now to FIG. 5, a different process 500 is shown that may be used to produce a carboxylic acid. In the process 500, an inlet broth 501 may be obtained and be added to an anolyte recirculation tank 503. The inlet broth 501 may comprise the products generated by the conversion reaction 110 (such as, for example, a fermentation reaction) of FIG. 1. A pump 505 and/or one or more valves 507 (as needed) may be used to introduce the inlet broth 501 from the mixing tank 503 into the electrolysis cell 104 (or 104*a*).

It should be noted that the caustic loop 434 of the process 500 (which is associated with the catholyte) operates in the same manner as the caustic loop 434 of FIG. 4. Accordingly, for purposes of brevity, a discussion of the caustic loop 434 will not be repeated.

In addition to a caustic loop 434, the process 500 also may include a solvent loop 540 that may be used to extract the produced carboxylic acid from the anolyte 230 (not shown in FIG. 5). As noted above, the anolyte 230 in the anodic compartment 206 (not shown in FIG. 5) may comprise a first solvent 234 (not shown in FIG. 5) and a second solvent 232 (not shown in FIG. 5). (The first solvent 234 may be water and the second solvent 232 may be an organic solvent). The alkali salt of the carboxylic acid 224 (not shown in FIG. 5) is preferentially present in the first solvent 234 and the formed carboxylic acid 228 (not shown in FIG. 5) is preferentially present in the second solvent 232. The anolyte 230 may be extracted 441 from the cell 104/104*a* and added to a liquid-liquid separation tank 442. The separation tank 442 contains a first solvent (water phase) 495 and a second solvent (organic solvent) 497. The second solvent (organic phase) 497 contains the formed carboxylic acid 228 and is separated 445 from the water 495 (first solvent).

This separated second solvent 497 may, as needed, be subjected to a heat exchange/temperature exchange 447 (that may be powered by one or more utilities 449 such as steam). One or more valves 452 may be used to introduce chemicals that may be needed in the heat exchange/temperature exchange 447. Those skilled in the art will appreciate the processes necessary to accomplish this heat exchange/temperature exchange. The utility (such as steam) may be recollected and reused 451 after this heat exchange/temperature exchange 447 has occurred.

After finishing the heat exchange/temperature exchange reaction 447, a distillation reaction may occur upon the second solvent 497. This distillation process (or other separation process) may occur within a distillation column 455. The distillation column 455 separates out the various components from the second solvent 497. For example, the carboxylic acid 457 (such as lactic acid) that was found in the second solvent 232 may be extracted and processed further, concentrated, used, etc. Any water 461 that may have been present in the second solvent 497 may also be removed and re-used, treated, disposed of, etc. Likewise, any oxygen gas 459 (which was produced in the anolyte reaction) may also be removed from the tank 442 and collected, disposed of, sold, used, etc.

However, unlike the embodiment of FIG. 4, the solvent 497 from the distillation column 455 may be extracted 571 and be returned 572 to the liquid-liquid separation tank 442, where it may re-mix with the other anolyte 230 and be reused.

The process 500 may also include a water loop 570. The water loop 570 begins when a portion of the water phase 495 (e.g., the first solvent) is removed 581 from the liquid-liquid separation tank 442. This removed liquid may then be filtered 583 to remove contaminants 585.

Once filtered, the water phase 495 may then be subjected to a heat exchange/temperature exchange 578 (that may be powered by one or more utilities 580). One or more valves 582 may be used to introduce chemicals that may be needed in the heat exchange/temperature exchange. Those skilled in the art will appreciate the processes necessary to accomplish this heat exchange/temperature exchange 578. The products of this heat exchange/temperature exchange 578 are then added 591 to the tank 503 so that they may ultimately be reused in the cell 104/104a. In one embodiment, only the water phase is introduced into the cell, thus simplifying the process, but risking a lower pH within the cell. In such an embodiment, higher flow rates through the cell may be utilized to manage this risk.

Thus, the process 500 represents a continuous process where the products are continuously being produced and removed from the system. Thus, a fresh, updated supply of the anolyte 230 and catholyte 226 (not shown in FIG. 5) may continuously be present in the cell 104/104a. This process 500 provides an external liquid-liquid extraction process using the tank 442.

Figure 6:
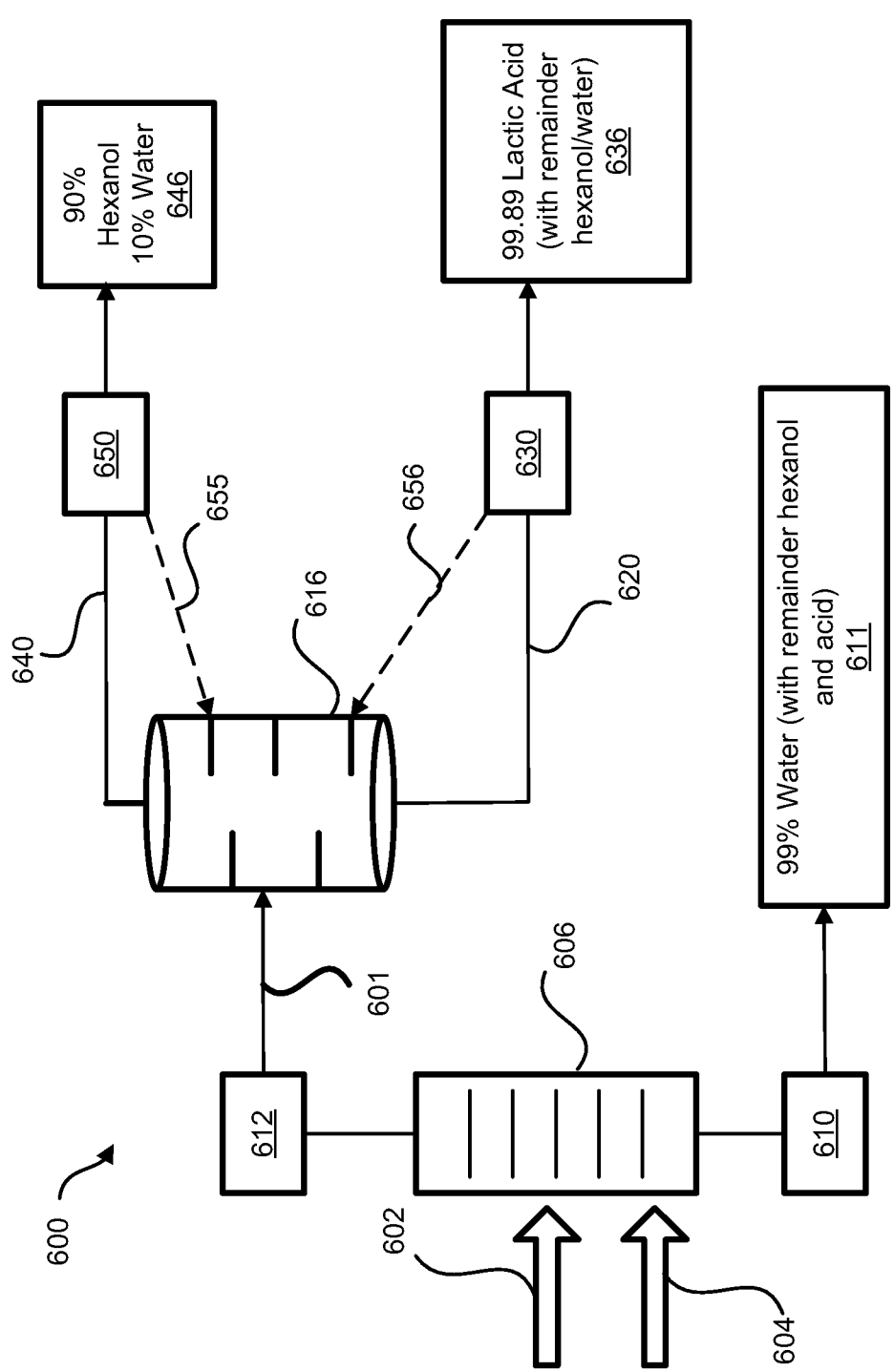
FIG. 6 shows a schematic diagram of a computer-simulated method for separating a carboxylic acid from an anolyte mixture.

Referring now to FIG. 6, a computer simulation using CHEMCAD® software was performed to analyze a separation process that may be used in the present embodiments. This computer-simulated process 600 is shown in FIG. 6. This computer-simulated process 600 involves separating out a carboxylic acid from a mixture of water and an organic solvent (which may be, for example hexanol, cyclohexanol, octonal, and butanol or other solvents). Specifically, an anolyte mixture of two different solvents is simulated. This mixture comprises a solution 602 of 20% lactic acid/80% water and a solution of hexanol 604. The solutions 602, 604 are mixed in a liquid-liquid extractor 606. In the simulation of FIG. 6, 4.5 L of the hexanol 604 is mixed with every 1 L of the water solution 602. Thus, there is substantially more hexanol in the simulated mixture than there is water.

As shown by FIG. 6, the liquid-liquid extractor 606 is able to separate the water from the hexanol and the lactic acid. Specifically, water may be extracted 610 from the extractor 606. According to the simulation, the water 611 will be about 99% (with the remainder being hexanol and lactic acid). Likewise, a mixture of hexanol and lactic acid may also be extracted 612 from the liquid-liquid extractor 606.

According to the simulation of FIG. 6, the mixture 601 of hexanol/lactic acid, which may or may not contain a minor fraction of water, may then be subjected to a distillation column 616. This distillation column 616 operates to separate the lactic acid from the hexanol. Specifically, the lactic acid is extracted 620 from the column 616 (and subjected to a heat exchange/temperature exchange process or other purification process 630 as needed). The simulation indicates that the quantity of lactic acid 636 that may be obtained from such processes is over 99% pure.

Similarly, the hexanol may be extracted 640 from the column 616 (and may be subjected to a heat exchange/temperature exchange process or other purification reaction 650) as needed). The simulation indicates that the quantity of hexanol 646 that that may be obtained from such processes is 90% pure (with some water contained therein).

As shown by the dashed arrows 655, 656, in one embodiment, if the samples are not properly treated by heat exchange/temperature exchange processes 630, 650, a sample may be returned to the column 616, as needed, in order to properly treat the flows. In one embodiment, the "reflux ratio" of a distillation column may be used to determine how much of the sample is removed from the top or bottom of the column 616 compared to how much is sent back into the column 616. Other ways know to those of skill in the art may be used to operate the column 616 in order to improve the separation of chemicals.

As can be seen from the present embodiments, it may be desirable to separate some of the products (such as the carboxylic acid) during an electrolysis process, so that these chemicals do not poison a NaSICON (or other similar) membrane. However, those of skill in the art will recognize that the embodiments and techniques disclosed herein may also be used in order to isolate one or more reactants (as needed) from the NaSICON membrane, thereby preventing the reactants from fouling the membrane. It may be desirable to separate reactants and/or products during electrolysis in a NaSICON membrane-containing electrolytic cell because:

(1) either the reactant(s) or the product(s) affect the performance of the anode;

(2) either the reactant(s) or the product(s) affect the performance of the membrane;

(3) continuous (not batch) production and separation of the product(s) are more easily accomplished; and (4) the separation of the reactant(s) or product(s) from the anolyte may increase the operational current density.

It should further be noted that embodiments may be constructed in which the particular organic solvent used is specifically selected/tailored to the particular carboxylic acid. For example, if the produced carboxylic acid is lactic acid, there may be other impurities (or other types of carboxylic acids) that are present in the anolyte. It may be possible to construct embodiments in which the organic solvent preferentially dissolves the desired product (the lactic acid) and does not dissolve (or perhaps dissolves to a lesser extent) the other organic impurities and/or other carboxylic acids in the anolyte, thereby increasing the purity of the obtained carboxylic acid. Those skilled in the art would appreciate how to select these solvents for each particular system/produced carboxylic acid.

While many of the examples provided herein involve the formation of lactic acid as the carboxylic acid product, the teachings of this disclosure can be used to produce other types of carboxylic, including citric acid, oleic acid, adapic acid, decanoic acid and other acids from their corresponding alkali salts.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method of producing a carboxylic acid in an electrolysis cell, comprising:
   obtaining a multi-compartment electrolysis cell comprising an anodic compartment, a cathodic compartment, and a solid alkali ion transporting membrane;
   adding an anolyte into the anodic compartment, wherein the anolyte comprises an alkali salt of a carboxylic acid, a first solvent and a second solvent, and wherein the alkali salt of the carboxylic acid is partitioned into the first solvent; and
   electrolyzing the anolyte to produce a carboxylic acid, wherein the produced carboxylic acid is partitioned into the second solvent.

2. The method of claim 1, further comprising separating the second solvent from the first solvent to recover the produced carboxylic acid.

3. The method of claim 2, further comprising removing the anolyte from the multi-compartment electrolysis cell after the anolyte is electrolyzed.

4. The method of claim 3, wherein the produced carboxylic acid is separated from the second solvent external to the multi-compartment electrolysis cell.

5. The method of claim 4, wherein the anolyte is re-fed back into the anodic compartment, wherein the second solvent devoid of the carboxylic acid product is recombined with the first solvent before the anolyte is re-fed back into the anodic compartment.

6. The method of claim 3, wherein the anolyte is re-fed back into the anodic compartment, wherein the second solvent is separated from the first solvent before the anolyte is re-fed back into the anodic compartment.

7. The method of claim 1, wherein the produced carboxylic acid comprises lactic acid and the alkali salt of a carboxylic acid comprises sodium lactate.

8. The method of claim 1, wherein the solid alkali ion transporting membrane comprises a NaSICON membrane.

9. The method of claim 1, wherein the solid alkali ion transporting membrane separates the anodic compartment from the cathodic compartment.

10. The method of claim 1, wherein the multi-compartment electrolysis cell further comprises a middle compartment, wherein the solid alkali ion transporting membrane separates the cathodic compartment from the middle compartment, wherein an anionic membrane separates the middle compartment from the anodic compartment.

11. The method of claim 1, wherein the first solvent comprises water and the second solvent comprises an organic solvent.

12. A method of producing a carboxylic acid in an electrolysis cell, comprising:
   providing a multi-compartment electrolysis cell comprising anodic and cathodic compartments separated by a solid alkali ion permeable membrane;
   adding an anolyte comprising an alkali salt of a carboxylic acid into the anodic compartment with first and second solvents, wherein the alkali salt of the carboxylic acid is partitioned into the first solvent;
   electrolyzing the anolyte to produce a carboxylic acid, wherein the produced carboxylic acid is partitioned into the second solvent; and
   separating the second solvent from the first solvent to recover the produced carboxylic acid.

13. A method of producing a carboxylic acid in an electrolysis cell, comprising:
   providing a multi-compartment electrolysis cell comprising anodic and cathodic compartments, a solid alkali ion permeable membrane, and a middle compartment, wherein the solid alkali ion permeable membrane separates the cathodic compartment from the middle compartment and an anionic membrane separates the middle compartment from the anodic compartment;
   adding an anolyte comprising an alkali salt of a carboxylic acid into the anodic compartment with first and second solvents, wherein the alkali salt of the carboxylic acid is partitioned into the first solvent;
   electrolyzing the anolyte to produce a carboxylic acid, wherein the produced carboxylic acid is partitioned into the second solvent; and
   separating the second solvent from the first solvent to recover the produced carboxylic acid.

14. The method of claim 13, further comprising removing the anolyte from the multi-compartment electrolysis cell after the anolyte is electrolyzed.

15. The method of claim 14, wherein the produced carboxylic acid is separated from the second solvent external to the multi-compartment electrolysis cell.

16. The method of claim 15, wherein the anolyte is re-fed back into the anodic compartment, wherein the second solvent devoid of the carboxylic acid product is recombined with the first solvent before the anolyte is re-fed back into the anodic compartment.

17. The method of claim 14, wherein the anolyte is re-fed back into the anodic compartment, wherein the second solvent is separated from the first solvent before the anolyte is re-fed back into the anodic compartment.

18. The method of claim 13, wherein the produced carboxylic acid comprises lactic acid and the alkali salt of a carboxylic acid comprises sodium lactate.

19. The method of claim 13, wherein the solid alkali ion transporting membrane comprises a NaSICON membrane.

* * * * *